United States Patent
Byun (10) Patent No.: US 9,541,709 B2
(45) Date of Patent: Jan. 10, 2017

(54) OPTICAL MODULE PROTECTION COVER INSTALLED AT EDGE OF OPTICAL MODEM

(71) Applicant: UBIQUOSS Inc., Gyeonggi-do (KR)

(72) Inventor: Kwang Soo Byun, Gyeonggi-do (KR)

(73) Assignee: UBIQUOSS INC. (KR)

( * ) Notice: Subject to any disclaimer, the term of this patent is extended or adjusted under 35 U.S.C. 154(b) by 0 days.

(21) Appl. No.: 14/618,186

(22) Filed: Feb. 10, 2015

(65) Prior Publication Data

US 2016/0231515 A1    Aug. 11, 2016

(51) Int. Cl.
| | | |
|---|---|---|
| *G02B 6/00* | (2006.01) | |
| *H01R 4/50* | (2006.01) | |
| *H01R 13/625* | (2006.01) | |
| *G02B 6/36* | (2006.01) | |
| *G02B 6/38* | (2006.01) | |

(52) U.S. Cl.
CPC ............... *G02B 6/36* (2013.01); *G02B 6/389* (2013.01); *G02B 6/3887* (2013.01); *G02B 6/3893* (2013.01)

(58) Field of Classification Search
CPC ....... G02B 6/3887; G02B 6/3895; G02B 6/36; G02B 6/389; G02B 6/3807; G02B 6/3893
USPC .................. 385/134, 136; 439/345, 384, 527
See application file for complete search history.

(56) References Cited

U.S. PATENT DOCUMENTS

| | | | | |
|---|---|---|---|---|
| 5,274,722 A | * | 12/1993 | Saitoh ................. | G02B 6/3897 385/75 |
| 6,874,944 B1 | * | 4/2005 | Hermsen ............. | G02B 6/3849 385/55 |
| 6,926,449 B1 | * | 8/2005 | Keenum ............. | G02B 6/4477 385/135 |
| 2005/0281526 A1 | * | 12/2005 | Vongseng ............. | G02B 6/445 385/135 |
| 2006/0269195 A1 | * | 11/2006 | Miyao ................. | G02B 6/4292 385/92 |
| 2010/0003002 A1 | * | 1/2010 | Bernard ............... | G02B 6/3897 385/139 |

* cited by examiner

*Primary Examiner* — Robert Tavlykaev
(74) *Attorney, Agent, or Firm* — Levenfeld Pearlstein, LLC (57) ABSTRACT

Provided is a protection cover for protecting an optical module. The protection cover installed at an edge of an optical modem in which the optical module is randomly separable without opening a case includes a bottom cover including a hinge and screw coupling hole at one end thereof, a pair of side covers extending toward left and right upper sides from the bottom cover, each of the pair of side covers including a hook at one side thereof, a front cover extending toward a front upper side from the bottom cover, the front cover having a U-shaped front groove, and a pair of top cover horizontally extending from the side covers and the front cover, the pair of top covers having trapezoid-shaped top grooves that are spaced apart from each other.

9 Claims, 10 Drawing Sheets

FIG.1

(Prior Art)

FIG.2

(Prior Art)

FIG.3

(Prior Art)

OPTICAL MODULE PROTECTION COVER INSTALLED AT EDGE OF OPTICAL MODEM

BACKGROUND OF THE INVENTION

The present invention disclosed herein relates to an optical module protection cover and an optical modem including the same, and more particularly, a protection cover for protecting an optical module in an optical modem in which the optical module may be removed from the optical modem without opening an optical modem case.

In more detail, since an optical module is installed on an edge of a case to secure a clearance for an optical modem, a protection cover is installed on the case and then locked to prevent the optical module from being accidentally separated from the case, thereby preventing the optical module from being robbed. Furthermore, the separation of an optical cable coupled to the optical module may be prevented to fundamentally preventing optical losses occurring while the optical cable is separated, thereby preventing safety accidents.

In recent years, internet traffic is significantly increasing continuously. As the construction of wired and wireless integrated network is visualized, development of an optical access network technology that is represented by the fiber-to-the-home (FTTH) is being accelerated. A passive optical network (PON) technology that leads FTTH markets may be a point-to-multipoint based optical access network technology using, as a remove node (RN), a passive splitter in which it is unnecessary to supply a power.

Thus, since the PON technology has advantages of not only providing a high bandwidth to a subscriber but also significantly reducing network operation costs because the PON technology is realized by using only a passive device such as a splitter, the PON technology being spread in use.

The PON technology may be largely classified into two technologies according to multiplexing and multiplexing access techniques. One of the two technologies is a time division multiplexing (TDM)-PON, and the other is a wavelength division multiplexing (WDM)-PON. Here, the TDM-PON may include a broadband PON (B-PON) and gigabit-capable PON (G-PON) that are standardized by ITU-T and an Ethernet PON (E-PON) that is standardized by IEEE.

Recently, the ITU-T and IEEE enhance each PON standard to a level of about 10 Gbps so as to satisfy bandwidth requirements of the user. Also, the ITU-T has completed the XG-PON1 (10 Gigabit PON) standard following the G-PON, and The IEEE has completed the 10G-EPON standard following the E-PON.

Figure 1:
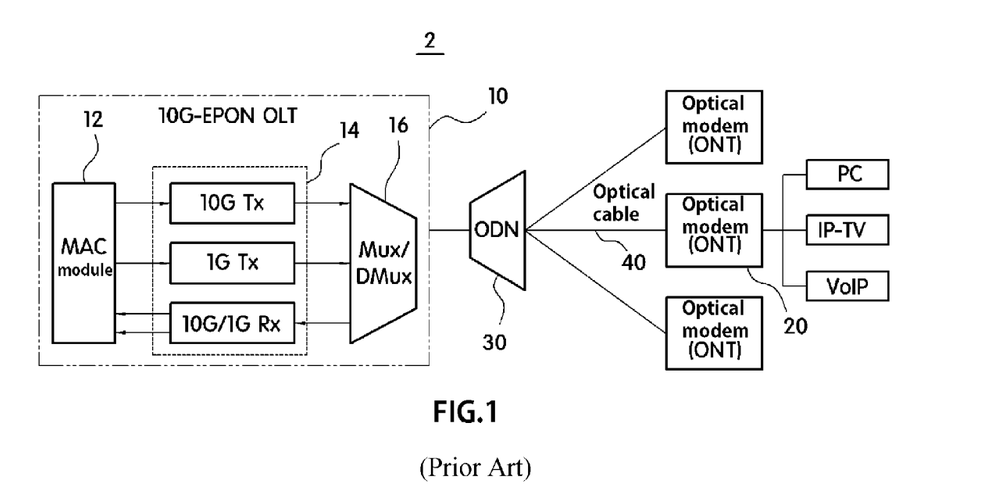
FIG. 1 is a view of a 10G-EPON according to a related art.

FIG. 1 is a view of an example of a 10G-EPON according to the related art. Referring to FIG. 1, a 10G-EPON 2 has a structure in which a plurality of subscriber-side optical network terminals (ONTs) 10 (or optical modems 20) share a carrier-side optical line terminal (OLT) 10 and an optical cable 40 by using a TDM-PON-based time division technique.

The 10G-EPON 2 includes the communication company-side 10G-EPON OLT 10, the subscriber-side the EPON ONT 20, and an optical distribution network (ODN) 30 for an optical signal distribution (downstream light signal power splitting and upstream light signal power coupling) between the 10G-EPON OLT 10 and the EOPON ONT 20.

The 10G-EOPN OLT 10 includes a MAC module 12, a three-wavelength optical transceiver 14, and a wavelength division splitter/coupler 16. The three-wavelength optical transceiver 14 may include a 10G optical transceiver 10G TX generating a 10G downstream signal, a 1G optical transceiver 1G TX generating a 1G downstream signal, and a dual-rate burst mode optical receiver (dual-rate BMR) receiving a burst mode signal in which the 1G signal and the 10G signal are mixed with each other.

As a result, users may enjoy Giga Internet which is 10 times faster than 100 Mbps through PCs, IP-TVs, and VoIPs in homes, i.e., Internet service that offers speeds greater than maximum 1 Gbps. Thus, the users may watch high-quality video in real time or share Giga data at a faster speed.

Figure 2:
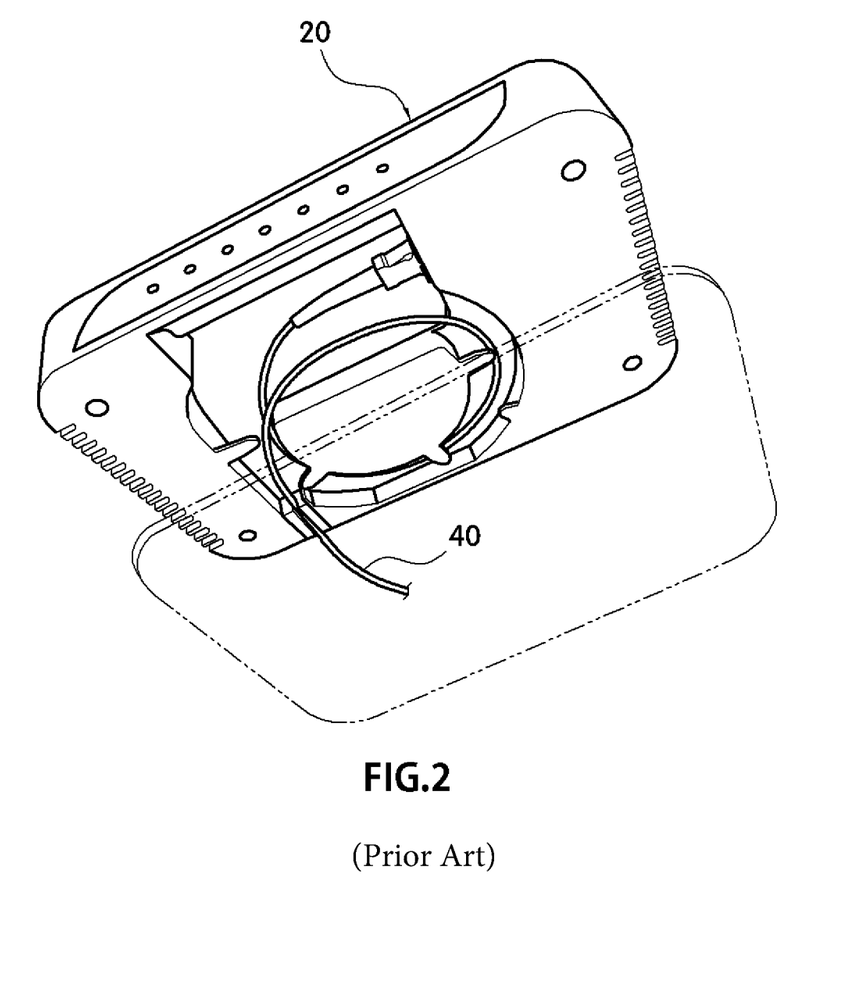
FIG. 2 is a view of an example illustrating an optical module installed at a center of an optical modem according to the related art.

Referring to FIG. 2, an optical module (not shown) is installed on a PCB within an optical modem 20. When the optical module is disposed at a center of the PCB, since the number of components increases, the total volume of the optical modem 20 may increase.

Figure 3:
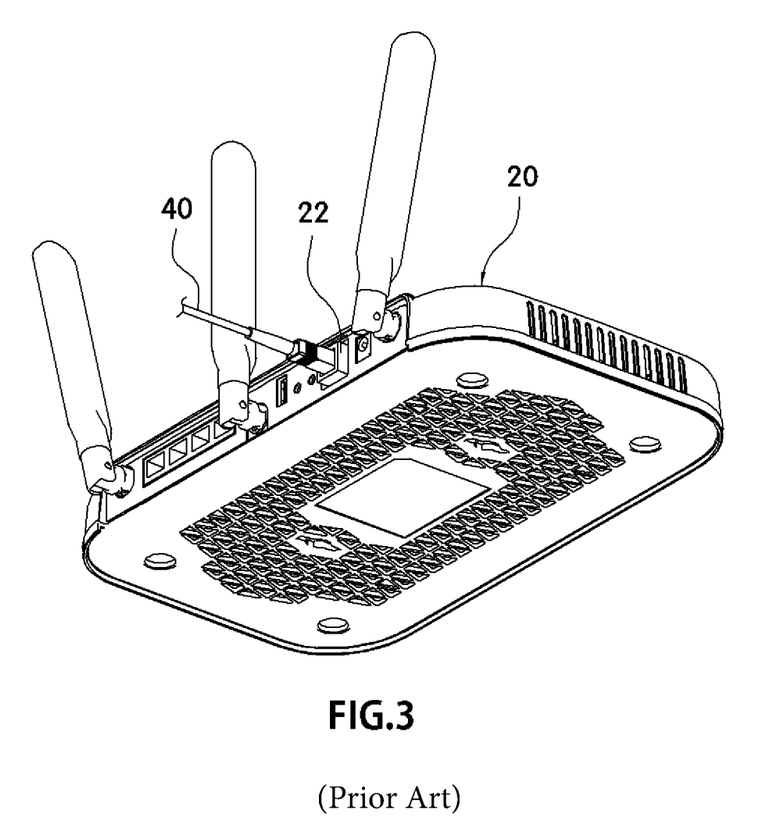
FIG. 3 is a view illustrating an example of an optical module installed at an edge of the optical modem according to the related art.

Thus, as illustrated in FIG. 3, since the optical module is disposed on an edge of the PCB, a space for installing surplus equipment may be secured at the center to maintain an original size of a case of the optical modem 20 even though the number of components increases. Here, it may be difficult to separate the optical module 22 without opening the case of the optical modem 20.

Thus, when the optical module 22 is installed on the edge of the PCB, the optical module 22 may be partially exposed from the case of the optical modem 20. Since the optical module 22 is installed to be partially exposed from the case of the optical modem 20, the optical module 22 may be removed without opening the case of the optical modem 20. Accordingly, a user or third person can easily remove and take the optical module because the optical module is very expensive.

Also, when the optical cable 40 is separated from the optical module 22, light emitted from a laser diode (LD) may be lost from the optical cable 40 while data is transmitted. Here, if the lost light is illuminated to eyes of a person, the person may go blind. Thus, it is important that the optical cable 40 does not accidentally separate from the optical module 22.

PRIOR ART DOCUMENTS

Patent Documents

Korean Patent Publication No. 10-2011-0124687

SUMMARY OF TITLE INVENTION

The present invention provides an optical module protection cover that is installed on an optical modem to prevent an optical module from being accidentally separated from an optical modem case in the optical modem in which the optical module is removably installed without opening the optical modem case.

The present invention also provides an optical module protection cover that is installed on an optical modem to prevent a connector of an optical cable coupled to an optical module from being accidentally separated from the optical module.

Embodiments of the present invention provide an optical modem including an optical module protection cover, in which an optical module for converting an optical signal transmitted through an optical cable into an electrical signal or converting an electrical signal into an optical signal is disposed on an edge of an PCB within the optical modem to secure a clearance so that the optical module is removably installed, the optical modem including: a case of the optical modem having at least one port; a connector of the optical module, which receives a downstream optical signal, transmits an upstream optical signal, and is partially exposed to the outside of the optical modem case through the port; a connector of the optical cable, which is coupled to the optical module connector; and a protection cover detachably disposed on the optical modem case to protect each of the optical module connector and the optical cable connector.

In other embodiments of the present invention, a protection cover for protecting an optical module in an optical modem in which the optical module may be removed without opening a case includes: a bottom cover including a hinge and screw coupling hole at one end thereof; a pair of side covers extending toward left and right upper sides from the bottom cover, each of the pair of side covers including a hook at one side thereof; a front cover extending toward a front upper side from the bottom cover, the front cover having a U-shaped front groove; and a pair of top cover horizontally extending from the side covers and the front cover, the pair of top covers having trapezoid-shaped top grooves that are spaced apart from each other.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the drawings, dimensions of layers and regions and relative sizes may be exaggerated for clarity of description. Like reference numerals refer to like elements throughout.

Hereinafter, an optical module protection cover installed on an optical modem according to the present invention will be described in detail with reference to the accompanying drawings.

The optical modem including the optical module protection cover according to the present invention may include an ONT terminal that is used for a fiber-to-the-home (FTTH) network. The FTTH network may include one optical line terminal (hereinafter, referred to as an "OLT") that corresponds to a super system, a plurality of optical network terminals (hereinafter, referred to as "ONTs") that corresponds to a sub system, and an optical distribution network (hereinafter, referred to as an "ODN") for connecting the one OLT to the plurality of ONTs. Thus, the optical modem according to the present invention may be defined as the ONT terminal connected to the one OLT through the ODN.

The FTTH network may have a structure in which a passive distributor or wavelength division multiplexing device is used between a subscriber connection node and a network terminal. Thus, the node may constitute a network having the form of a bus or tree structure. Thus, the FTTH network may have the form of an asynchronous transfer mode (ATM) PON (APON) or the form of Gigabit PON (GPON).

The optical module according to the present invention converts an optical transmission Tx power source and an optical receiving Rx power source to convert an optical signal transmitted through an optical cable into an electrical signal or convert an electrical signal into an optical signal. The optical module is disposed on a PCB within the optical modem.

The PCB may include an Up-line that is in charge of communicating with the super system, a communication port communicating with a PC or IP-TV in a home, an internal or external wireless antenna, a CPU for distributing the communication, and a power adaptor for supplying a power to the PCB in a broad sense. The PCB may include the Up-link that is in charge of optical-communicating with the OLT in a narrow sense. Thus, the MAC module in addition to the Tx power source and Rx power source may be disposed on the PCB.

However, the optical module may be detachably installed on an edge of the PCB. Thus, since the optical module may be removed without opening the optical modem case, the third person may randomly acquire the optical module.

Figure 4:
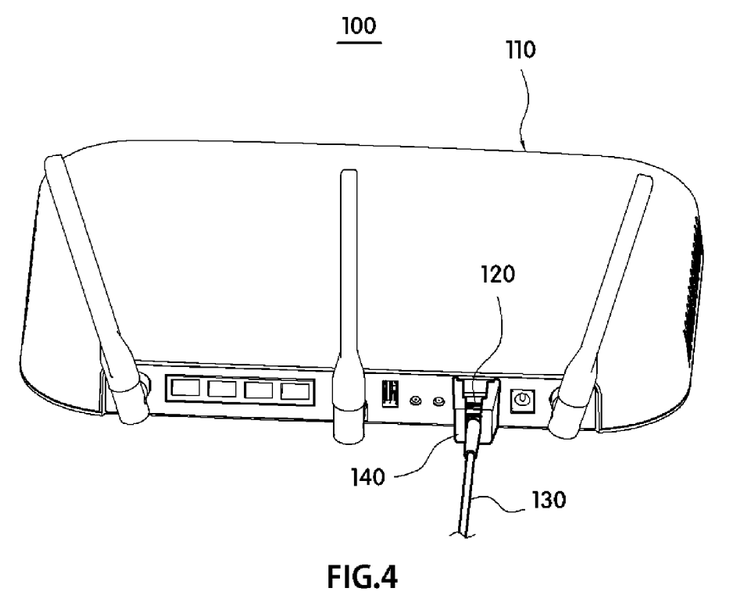
FIGS. 4 to 6 are front, bottom perspective, and exploded perspective views of an optical modem including an optical module protection cover according to the present invention.
Figure 5:
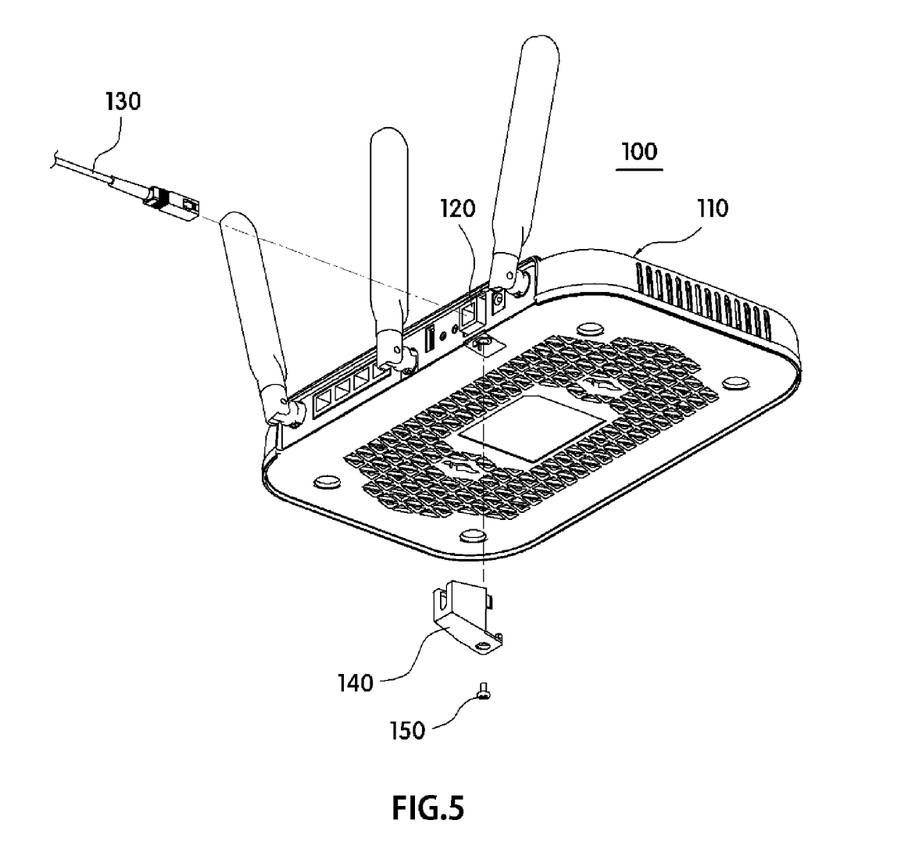
Figure 6:
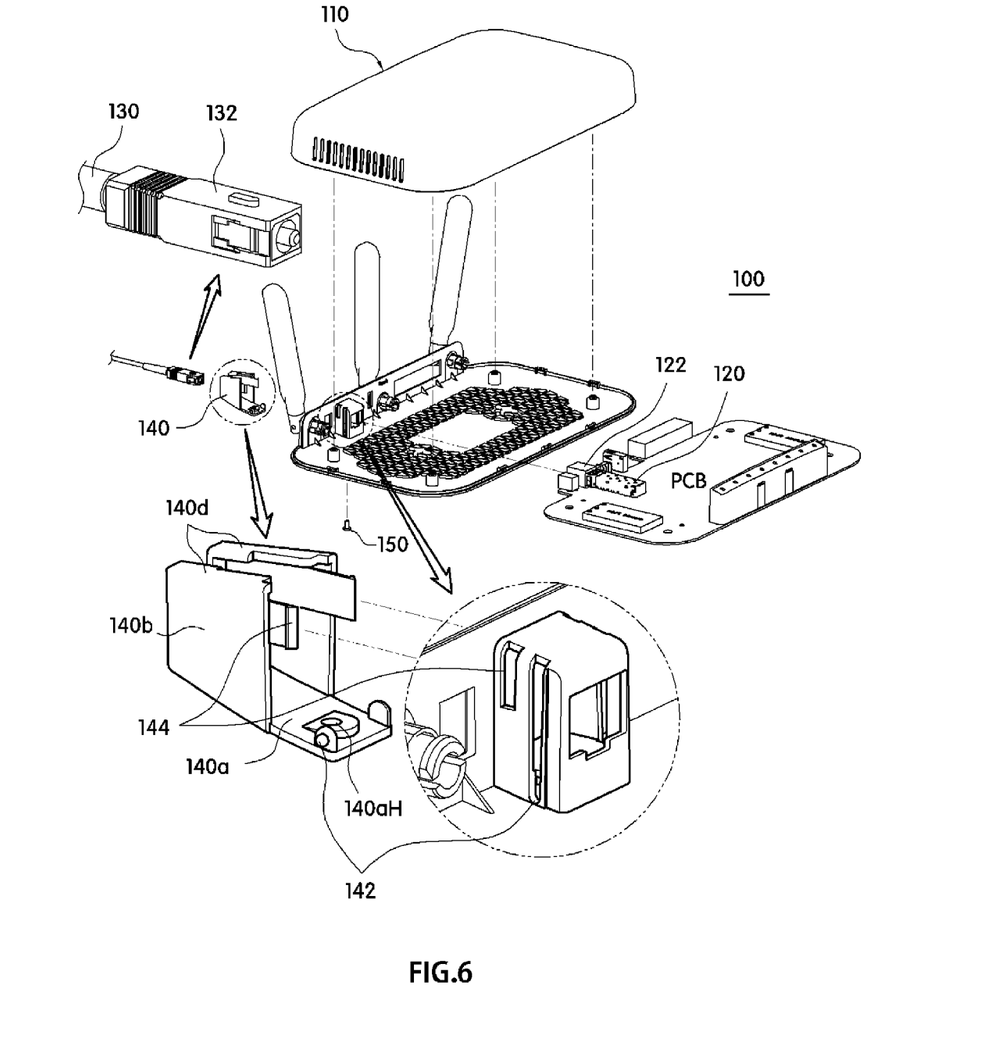

Referring to FIGS. 4 to 6, an ONT terminal 100 according to the present invention includes a case 110 of an optical modem having at least one port (not shown), a connector 122 of an optical module 120, which receives a downstream optical signal, transmits an upstream optical signal, and is partially exposed through a port P from the optical modem case 110, a connector 132 of an optical cable 130, which is coupled to the optical module connector 122, and a protection cover 140 detachably disposed on the optical modem case 110 to protect the optical module connector 122 and the optical cable connector 132.

Referring to FIG. 6, the protection cover 140 may have one side coupled to the bottom of the optical modem case 110 through a hinge 142 and the other side elastically coupled to a side surface of the optical modem case 110. The hinge 142 includes a protection cover-side hinge shaft and an optical modem case-side hinge groove. Here, the hinge groove may be longitudinally defined in a vertical direction. Also, since the hinge groove has a width that gradually increases upward, when the protection cover 140 is coupled, the hinge shaft may be inserted to correspond to the hinge groove and then be slid downward. As a result, the hinge shaft may be coupled to the hinge groove.

Figure 7:
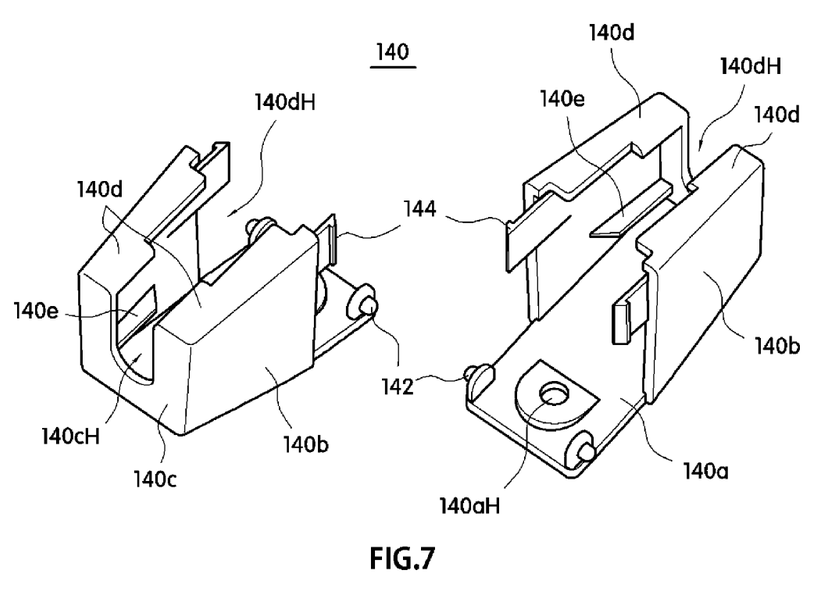
FIG. 7 is a perspective view of the optical module protection cover installed on the optical modem according to the present invention.

Referring to FIG. 7, the protection cover 140 may include a bottom cover 140*a* that corresponds to a bottom surface, a pair of side covers 140*b* respectively extending toward left and right upper sides, a front cover 40*c* extending toward a front upper side from the bottom cover 140*a* and having a front groove 140*c*H, and a pair of top covers 140*d* horizontally extending from the side covers 140*b* and the front cover 140*c* and having top grooves 140*d*H that are spaced apart from each other.

The pair of side covers 140*b* may include an elastic member 144 extending backward. The elastic member 144 may be provided as a hook assembly coupled to the side surface of the optical modem case 110. The hook assembly may be coupled in a manner in which a hook of each of the side covers 140*b* is inserted into a hook groove of the optical modem case 110.

The bottom cover 140*a* further includes an extension part extending so that the bottom of the optical modem case 110 is coupled to the above-described hinge 142. The extension part may further include a screw coupling hole 140*a*H that corresponds to the bottom. Here, a special screw that is driven by using an exclusive wrench may be used as a screw 150 coupled to the screw coupling hole 140*a*H.

The front groove 140*c*H may have a U shape so that the optical cable 130 is seated therein. Each of the bottom cover 140*a* and the side cover 140*b* may have a trapezoid shape having a width that gradually increases backward. The top groove 140*d*H may have a trapezoid shape corresponding to the trapezoid shape of the bottom cover 140*a*.

A support rib 140*e* for reinforcing strength or pushing the optical cable connector 132 backward when the protection cover 140 is coupled may be further provided inside the side cover 140*b*.

Figure 8:
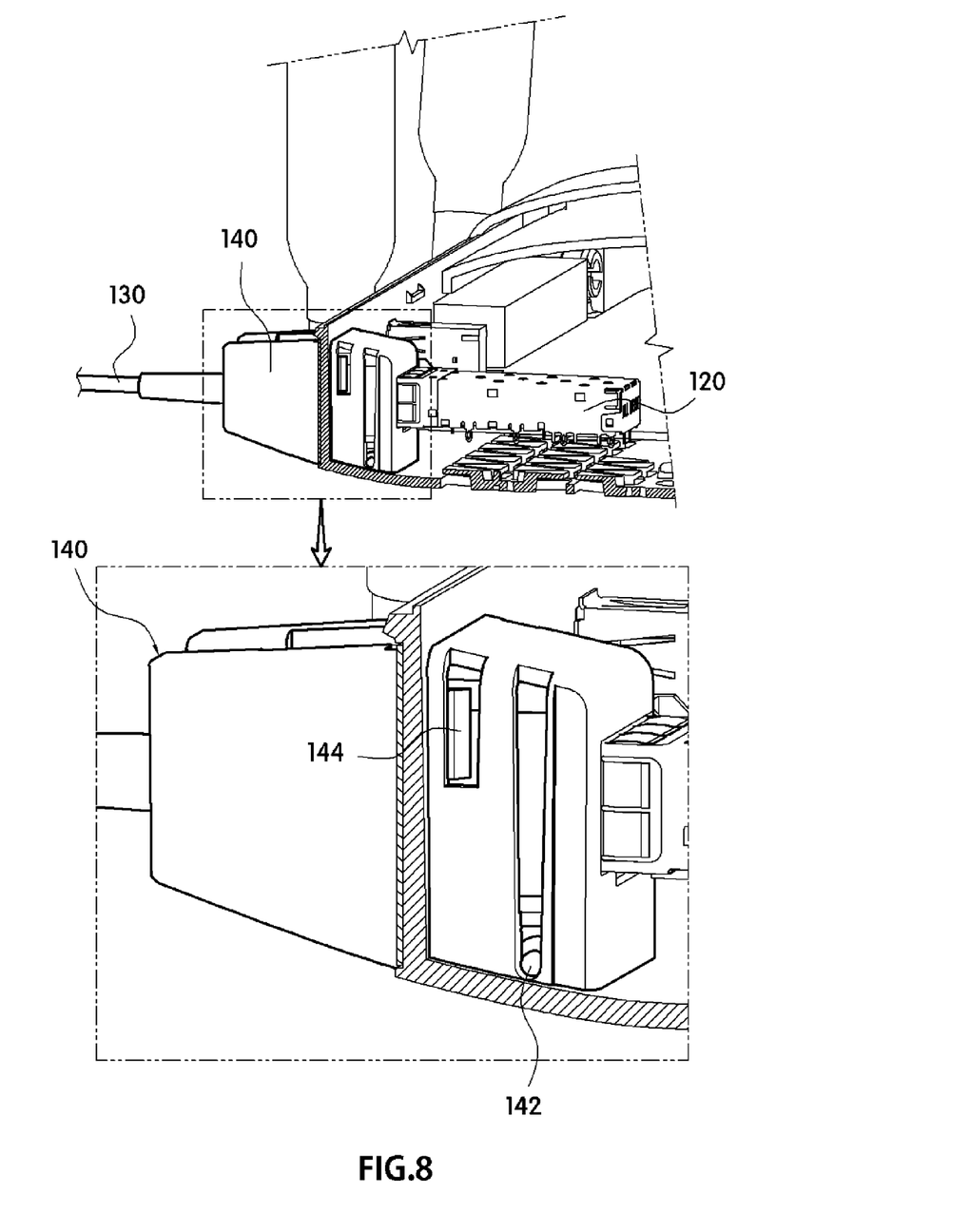
FIGS. 8 and 9 are partial enlarged perspective and cross-sectional perspective views of the optical module and a coupled state of the optical cable according to the present invention.
Figure 9:
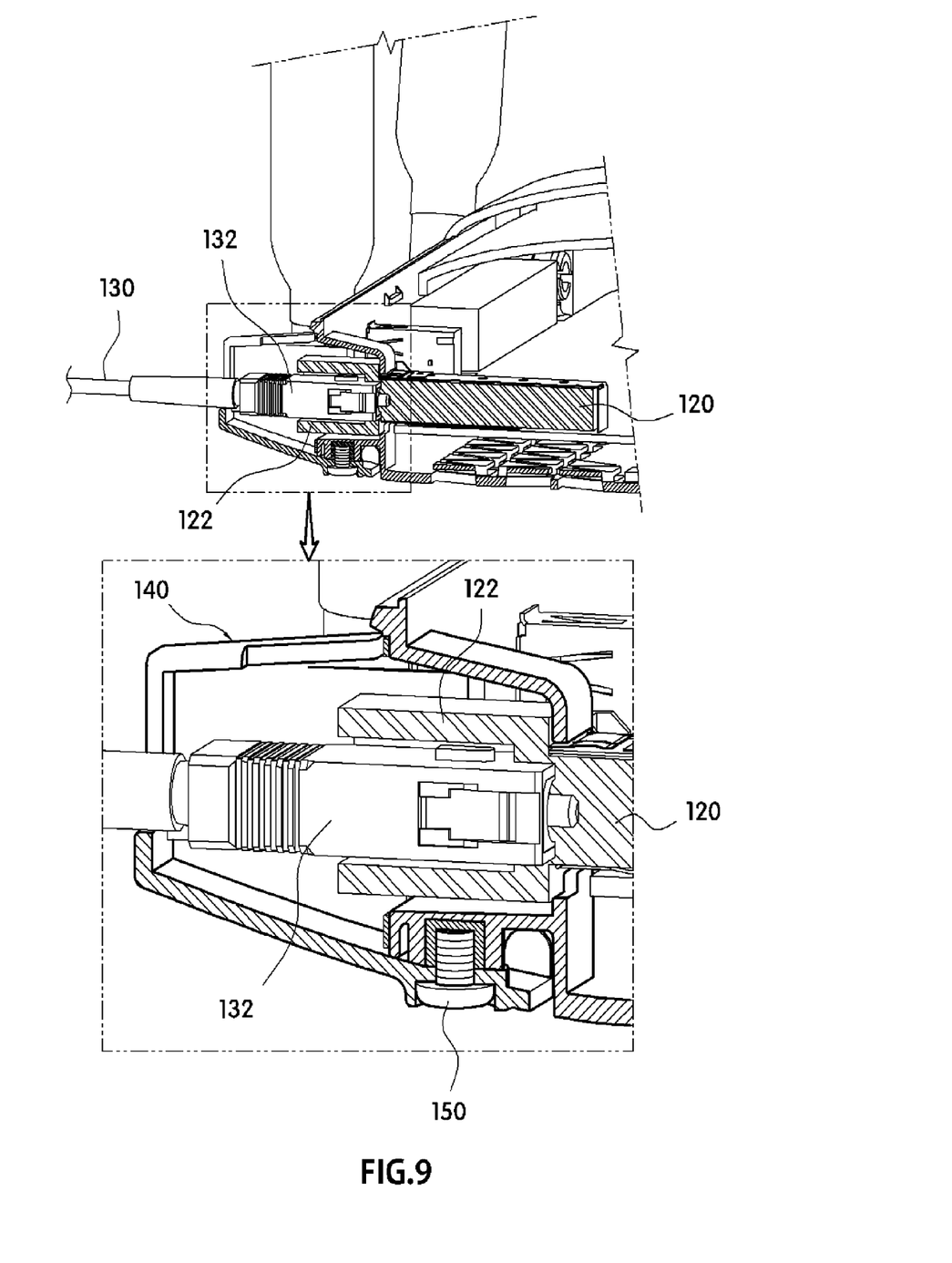

Referring to FIGS. 8 and 9, the optical module connector 122 and the optical cable connector 132 are supported by the front cover 140*c* and the top cover 140*d*, such that the optical module may not accidentally separate from the optical modem case 110 in the state where the protection cover 140 is coupled to the optical modem case 110.

Figure 10:
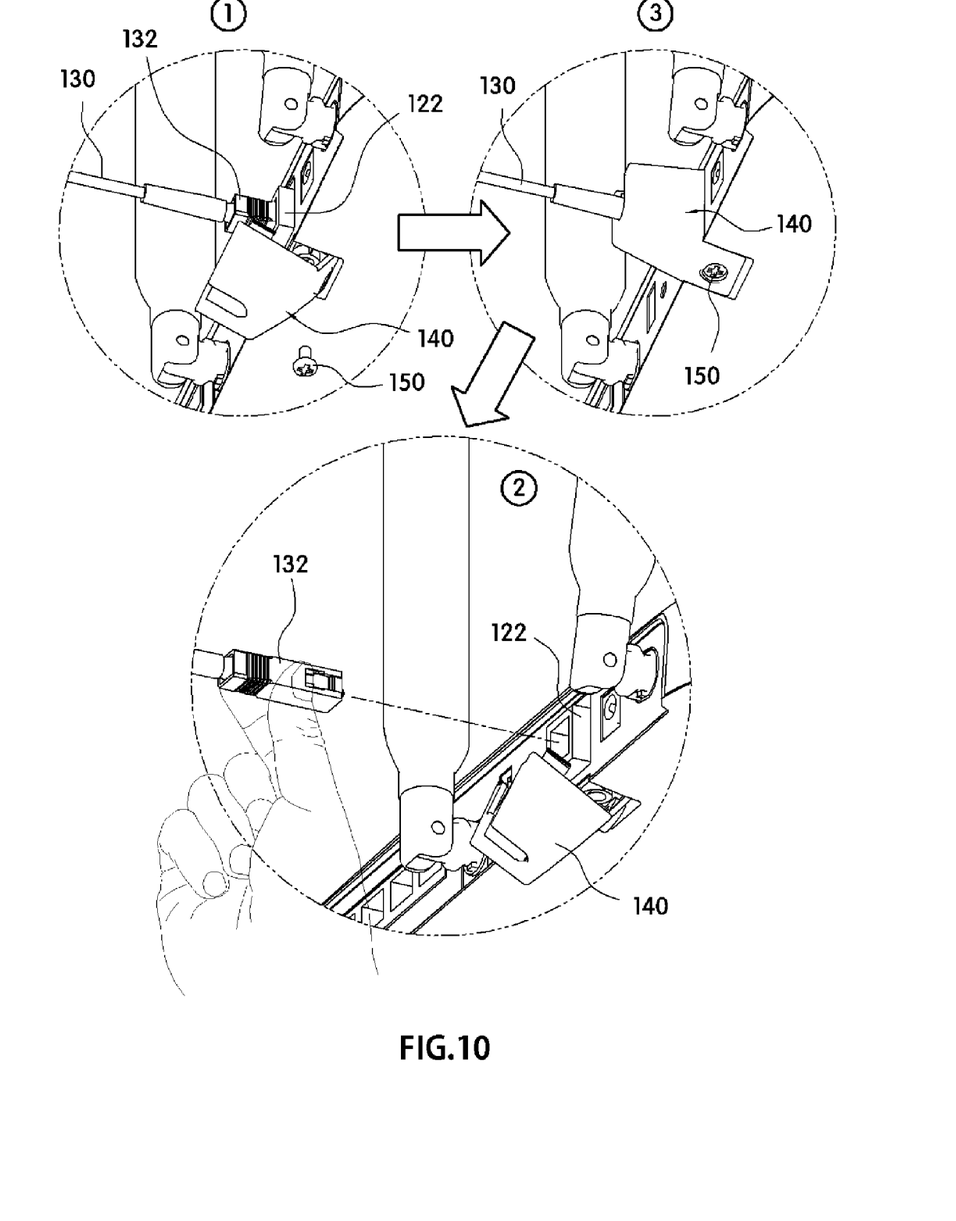
FIG. 10 is a view illustrating an example of a process for assembling the optical cable to the optical module according to the present invention.

Referring to FIG. 10, the coupling may be performed by simply press-fit when the optical module connector 122 and the optical cable connector 132 are coupled to each other (see FIG. 10 ①). If the optical module connector 122 and the optical cable connector 132 are separated from each other, a separation operation such as pushing or pulling using a hand has to be separately performed (see FIG. 10 ②). Here, the protection cover 140 may interrupt the separation operation, and thus, the coupling may not be released unless the protection cover 140 is removed (see FIG. 10 ③).

As described above, since the Tx power source and the Rx power source are installed on the edge of the Up-link to secure a clearance for the terminal, the installation and separation may be performed without opening the case. Accordingly, due to the worry of the theft, the protection cover may be installed so that the protection cover is not accidentally separated. Concomitantly, the releasing operation of the coupling between the optical cable and the optical module may be prevented by the protection cover to prevent optical losses from occurring. It should be understood that numerous other modifications and embodiments can be devised by those skilled in the art that will fall within the spirit and scope of the principles of this disclosure.

As described above, the present invention may expect the following effects.

First, the optical module may be installed without opening the optical modem case in comparison to the existing terminal in which the optical modem case has to be opened to install the optical module. Furthermore, even though the space for installing the surplus equipment in the case is secured, the third person may remove and take the optical module because the optical module is installed at a position that is near to the port. However, according to the optical module protection cover of the present invention, since the protection cover is installed to prevent the optical module from being accidentally separated, an economic effect in which terminal user's property is protected may be expected.

Second, since the optical cable connector is detachably connected to the optical module connector, the light irradiated through the optical cable may be illuminated to user's eyes or eyes of surrounding person to cause a safety accident when the optical cable connector is accidentally separated from the optical module connector. However, according to the present invention, since the optical cable connector may not be separated from the optical module connector unless the protection cover is removed, the safety accident may be prevented.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical modem comprising an optical module protection cover, in which an optical module for converting an optical signal transmitted through an optical cable into an electrical signal or converting an electrical signal into an optical signal is disposed on an edge of a PCB within the optical modem to secure a clearance so that the optical module is removably installed, the optical modem comprising:
   a case of the optical modem having at least one port;
   a connector of the optical module, which receives a downstream optical signal, transmits an upstream optical signal, and is partially exposed to the outside of the optical modem case through the port;
   a connector of the optical cable, which is coupled to the optical module connector; and
   a protection cover detachably disposed on the optical modem case to protect each of the optical module connector and the optical cable connector, wherein the protection cover comprises:
      a bottom cover that corresponds to a bottom;
      a pair of side covers extending toward left and right upper sides from the bottom cover, respectively;
      a front cover extending toward a front upper side from the bottom cover, the front cover having a front groove; and
      a pair of top covers horizontally extending from the side covers and the front cover, the pair of top covers having top grooves that are spaced apart from each other,
   wherein the protection cover is configured to support an optical cable, wherein the optical cable sits in the front groove when the connector of the optical module and the connector of the optical cable are coupled together, and wherein the coupled connectors are contained within the protection cover.

2. The optical modem of claim 1, wherein the optical modem comprises an optical network terminal (ONT) connected to an optical line terminal (OLT) through an optical distribution network (ODN).

3. The optical modem of claim 1, wherein the protection cover has one side hinge-coupled to a bottom of the optical modem case and another side elastically coupled to a side surface of the optical modem case.

4. The optical modem of claim 1, wherein each of the pair of side covers comprises a coupling part that extends backward, and
the coupling part comprises a hook elastically coupled to the side surface of the optical modem case.

5. The optical modem of claim 1, wherein the bottom cover comprises an extension part that extends to be hinge-coupled to the bottom,
the extension part has a screw coupling hole corresponding to the bottom, and
a screw that is driven by using an exclusive wrench passes through the screw coupling hole and is coupled to the bottom.

6. The optical modem of claim 1, wherein each of the bottom cover and the side covers has a trapezoid shape having a width that gradually increases backward,
the front groove has a U shape, and
the top groove has a trapezoid shape.

7. The optical modem of claim 1, wherein the front cover and the top covers are configured to support the optical module connector and the optical cable connector to prevent the optical module from being accidentally separated from the optical modem case in a state where the protection cover is coupled to the optical modem case.

8. The optical modem of claim 1, wherein the optical module connector and the optical cable connector are configured to be coupled by being simply press-fitted and configured to be separated from each other, the separation operation is separately performed, and
the protection cover interrupts the separation operation.

9. A protection cover for protecting an optical module in an optical modem in which the optical module is configured to be removed without opening a case, the protection cover comprising:
a bottom cover comprising a hinge and screw coupling hole at one end thereof;
a pair of side covers extending toward left and right upper sides from the bottom cover, each of the pair of side covers comprising a hook at one side thereof;
a front cover extending toward a front upper side from the bottom cover, the front cover having a U-shaped front groove; and
a pair of top covers horizontally extending from the side covers and the front cover, the pair of top covers having trapezoid-shaped top grooves that are spaced apart from each other,
wherein the protection cover is configured to support an optical cable, wherein the optical cable sits in the U-shaped front groove when an optical module connector and an optical cable connector are coupled together, and wherein the coupled connectors are contained within the protection cover.

* * * * *